United States Patent
Isobe et al.

(10) Patent No.: US 11,739,813 B2
(45) Date of Patent: Aug. 29, 2023

(54) PLANETARY REDUCTION GEAR

(71) Applicant: HARMONIC DRIVE SYSTEMS INC., Tokyo (JP)

(72) Inventors: Kohei Isobe, Azumino (JP); Kenta Takahashi, Azumino (JP)

(73) Assignee: HARMONIC DRIVE SYSTEMS INC., Tokyo (JP)

(*) Notice: Subject to any disclaimer, the term of this patent is extended or adjusted under 35 U.S.C. 154(b) by 0 days.

(21) Appl. No.: 17/608,605

(22) PCT Filed: Jul. 25, 2019

(86) PCT No.: PCT/JP2019/029233
§ 371 (c)(1),
(2) Date: Nov. 3, 2021

(87) PCT Pub. No.: WO2021/014647
PCT Pub. Date: Jan. 28, 2021

(65) Prior Publication Data
US 2022/0213947 A1 Jul. 7, 2022

(51) Int. Cl.
*F16H 1/46* (2006.01)
*F16H 57/08* (2006.01)

(52) U.S. Cl.
CPC .......... *F16H 1/46* (2013.01); *F16H 57/082* (2013.01)

(58) Field of Classification Search
CPC .......... F16H 1/46; F16H 57/082; F16C 25/06; F16C 19/12
See application file for complete search history.

(56) References Cited

U.S. PATENT DOCUMENTS 2,564,307 A * 8/1951 Keiser .................. H02K 5/1672
384/902
2,591,622 A * 4/1952 Shoup .................... F16C 19/543
384/563
(Continued)

FOREIGN PATENT DOCUMENTS

| JP | 2005201425 A | 7/2005 |
| JP | 2005291426 A | 10/2005 |
| JP | 2006307909 A | 11/2006 |

OTHER PUBLICATIONS

International Search Report (PCT/ISA/210) with translation and Written Opinion (PCT/ISA/237) dated Oct. 1, 2019, by the Japanese Patent Office as the International Searching Authority for International Application No. PCT/JP2019/029233. (7 pages).

*Primary Examiner* — Derek D Knight
(74) *Attorney, Agent, or Firm* — BUCHANAN INGERSOLL & ROONEY PC

(57) ABSTRACT

A planetary reduction gear using a helical gear is configured such that a rear-stage sun gear is rotatably supported by a device housing via a radial bearing on one side in the direction of a center axis, and is rotatably supported by a rear-stage planetary carrier via a thrust bearing on the other side. The rear-stage planetary carrier is rotatably supported by the device housing via a rear-stage carrier bearing. A preload is applied to the thrust bearing by a preload mechanism mounted to the rear-stage planetary carrier. Displacement of the rear-stage sun gear caused by a thrust force generated due to engagement with a rear-stage planetary gear can be suppressed, and an angle error between input rotation and output rotation can be suppressed.

5 Claims, 3 Drawing Sheets

(56) References Cited

U.S. PATENT DOCUMENTS

| | | | | |
|---|---|---|---|---|
| 6,570,283 B2* | 5/2003 | Niimi | ................ | H02K 5/10 |
| | | | | 310/43 |
| 7,621,835 B2* | 11/2009 | Oshidari | ............ | B60K 7/0007 |
| | | | | 475/5 |
| 8,016,531 B2* | 9/2011 | White | ............... | F16C 19/548 |
| | | | | 301/105.1 |
| 2009/0322171 A1* | 12/2009 | Wei | ................ | F16C 39/02 |
| | | | | 310/90 |

* cited by examiner

PLANETARY REDUCTION GEAR

TECHNICAL FIELD

The present invention is related to a planetary reduction gear using helical gears, and more particularly, to a planetary reduction gear provided with a mechanism to suppress the displacement of the sun gear caused by thrust force generated due to engagement with the planetary gear.

BACKGROUND ART

A known planetary reduction gear is the helical gear-type planetary reduction gear using helical gears as the sun gear, planetary gear and internal gear. In this type of planetary reduction gear, a thrust force is generated along the center axis due to the engagement of the helical gears. If the sun gear is displaced relative to the planetary gear in the axial direction due to the thrust force generated between the sun gear and planetary gear, the rotational motion is not transmitted accurately, and the angle error between input and output rotation increases.

For example, bearings can be used to fix the sun gear to suppress the displacement of the sun gear in the axial direction. In this case, it is difficult to eliminate the angle error because the internal gap of the bearing appears as the displacement in the axial direction of the sun gear.

To eliminate the displacement of the sun gear in the axial direction, the helical planetary gear reducer described in patent document 1 has a front-stage planetary carrier sandwiched by thrust bearings on both sides in the direction of its center axis, and the thrust bearings are preloaded by spring members.

PRIOR ART DOCUMENT

Patent Document

Patent Document 1: JP 2005-291426 A

SUMMARY OF THE INVENTION

Problem to be Solved by the Invention

In the case of a structure with two thrust bearings sandwiching the front-stage planetary carrier from both sides in the axial direction, the dimension in the axial direction increases as the front-stage planetary carrier and the two thrust bearings are arranged in the axial direction. This structure is not suitable if there is no space for installation in the axial direction.

The purpose of the present invention is to provide a planetary reduction gear of the helical gear-type incorporated with a simple and compact structure to suppress the movement of the sun gear in the axial direction.

Means of Solving the Problem

The planetary reduction gear of the present invention includes a cylindrical device housing, a front-stage planetary gear reduction mechanism and a rear-stage planetary gear reduction mechanism, these mechanisms being built into the device housing. The rear-stage planetary gear reduction mechanism includes: a rear-stage internal gear fixed to the device housing or integrally formed with the device housing; a rear-stage sun gear that is arranged coaxially inside the rear-stage internal gear and is connected and fixed coaxially to a front-stage planetary carrier, the front-stage planetary carrier being an output element of the front-stage planetary gear reduction mechanism; a rear-stage planetary gear engaging with each of the rear-stage internal gear and the rear-stage sun gear; a rear-stage planetary carrier that rotatably supports the rear-stage planetary gear and is rotatably supported by the device housing through a rear-stage carrier bearing; a first bearing supporting the front-stage planetary carrier; a second bearing supporting the rear-stage sun gear; and a preload mechanism that applies preload to the second bearing in a direction along the center axis towards the first bearing. The rear-stage internal gear, the rear-stage sun gear and the rear-stage planetary gear are helical gears, respectively. The first bearing is a radial bearing or a thrust bearing that rotatably supports the front-stage planetary carrier with respect to the device housing. The second bearing is a radial or thrust bearing that rotatably supports the rear-stage sun gear with respect to the rear-stage planetary carrier. The preload mechanism includes a fixed-position preload member that is fixed to the rear-stage planetary carrier and preloads the second bearing to a fixed position in the direction of the center axis.

In the planetary reduction gear of the present invention, the sun gear connected to the front-stage planetary carrier is supported from both sides in the direction of the center axis by the first bearing, which is a radial bearing or thrust bearing attached to the device housing, and the second bearing attached to the rear-stage planetary carrier. The sun gear is sandwiched between the first bearing and the second bearing with a predetermined preload force in a state in which a fixed-position preload is applied from the side of the second bearing to eliminate the bearing internal gap.

The increase in dimensions in the axial direction can be suppressed compared to the conventional structure where the front-stage planetary carrier is sandwiched by two pairs of thrust bearings on both sides in the direction of the center axis. By applying the fixed-position preload, the displacement of the sun gear in the direction of the center axis can be reliably prevented without being affected by any increase or decrease in the thrust force acting on the sun gear under load.

In the present invention, a thrust bearing which rotatably supports the rear-stage sun gear in the direction along the center axis can be used as the second bearing. A set screw that is fixed by screw-in to the rear-stage planetary carrier and applies a preload on the second bearing at a fixed position in the direction of the center axis can be used as the fixed-position preload member. When a set screw is used, it is desirable that a locking mechanism to prevent the set screw from loosening is provided.

MODE FOR CARRYING OUT THE INVENTION

An embodiment of a planetary reduction gear to which the present invention has been applied is explained below. The following explanation is not intended to limit the present invention to this embodiment.

Figure 1A:
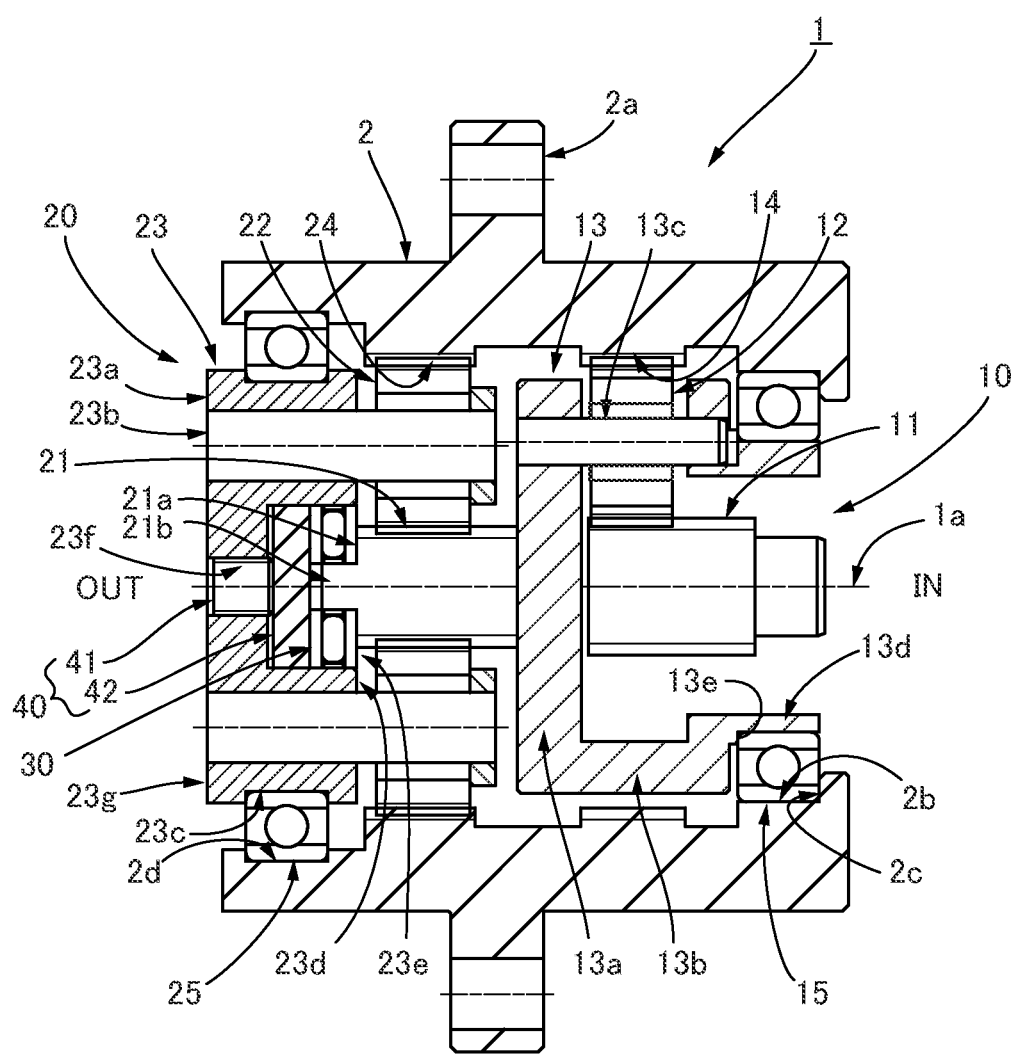
FIG. 1A is a schematic longitudinal sectional view showing an example of a planetary reduction gear to which the present invention is applied.

FIG. 1A is a schematic longitudinal sectional view of an embodiment of a helical-gear-type planetary reduction gear according to the present invention. Helical gears are used for each component gear of the planetary reduction gear 1. The planetary reduction gear 1 is a two-stage speed reducer provided with a front-stage planetary speed reduction mechanism 10 and a rear-stage planetary speed reduction mechanism 20. The front-stage planetary speed reduction mechanism 10 is provided with a front-stage sun gear 11, front-stage planetary gears 12, a front-stage planetary carrier 13 and a front-stage internal gear 14. The rear-stage planetary speed reduction mechanism 20 is provided with a rear-stage sun gear 21, rear-stage planetary gears 22, a rear-stage planetary carrier 23 and a rear-stage internal gear 24.

For example, the front-stage internal gear 14 and the rear-stage internal gear 24 are fixed-side gears. The front-stage sun gear 11 is a rotation input element to which a rotation from the outside is input. The front-stage planetary carrier 13 transmits a reduced-speed rotation through the front-stage planetary speed reduction mechanism 10 to the rear-stage sun gear 21 of the rear-stage planetary speed reduction mechanism 20. The rear-stage planetary carrier 23 is a reduced-speed-rotation output element that outputs a reduced-speed rotation through the rear-stage planetary speed reduction mechanism 20 to the outside.

The planetary reduction gear 1 is provided with a cylindrical device housing 2. The device housing 2 is fixed to a fixed-side member (not shown) through the mounting flange 2a formed on its outer peripheral surface. The front-stage planetary speed reduction mechanism 10 and the rear-stage planetary speed reduction mechanism 20 are assembled coaxially inside the device housing 2 and are arranged in the direction of the center axis 1a. In the device housing 2, one end thereof on the side of the front-stage planetary speed reduction mechanism 10 is referred to as an input end IN, and the other end thereof on the side of the rear-stage planetary speed reduction mechanism 20 is referred to as an output end OUT.

To explain in detail, the front-stage sun gear 11 is arranged concentrically on the side of the input end IN inside the device housing 2. The front-stage internal gear 14 is formed on the inner peripheral surface of the device housing 2 concentrically surrounding the front-stage sun gear 11. The front-stage planetary carrier 13 is provided with a disc part 13a located on the side of the output end OUT with respect to the front-stage sun gear 11, a cylindrical part 13b extending from the outer periphery of the disc part 13a toward the input end IN, and one or a plurality of front-stage planetary shafts 13c fixed to disc 13a. The front-stage planetary shafts 13c extend in a direction parallel to the center axis 1a from the disc 13a towards the input end IN. The front-stage planetary gear 12 is rotatably supported on the front-stage planetary shaft 13c. The front-stage planetary gear 12 engages with both the front-stage sun gear 11 and front-stage internal gear 14. The portion corresponding to each front-stage planetary gear 12 in the cylindrical part 13b of the front-stage planetary carrier 13 is an opening part.

The front-stage planetary carrier 13 is rotatably supported via a radial bearing 15 on the device housing 2, the radial bearing being the first bearing. The leading edge of the cylinder 13b of the front-stage planetary carrier 13 is a circular portion 13d. A radial bearing 15, for example, a deep groove ball bearing is mounted between the circular outer peripheral surface of the circular portion 13d and the inner peripheral surface 2b of the device housing 2 facing the circular outer peripheral surface. The radial bearing 15 is sandwiched in the direction of the center axis 1a by a circular step 13e formed on the circular portion 13d and a circular step 2c formed on the inner peripheral surface 2b of the device housing 2. The radial bearing 15 is not limited to a deep groove ball bearing, and an angular contact ball bearing, a cylindrical roller bearing, a tapered roller bearing, a thrust ball bearing or a thrust roller bearing can also be used.

The rear-stage sun gear 21 of the rear-stage planetary reduction mechanism 20 is fixed coaxially to the disc part 13a of the front-stage planetary carrier 13 and extends from here towards the output end OUT. The rear-stage internal gear 24 is formed on the inner peripheral surface of the device housing 2 concentrically surrounding the rear-stage sun gear 21. The rear-stage planetary carrier 23 is arranged coaxially at the side of the output end OUT with respect to the rear-stage sun gear 21. The rear-stage planetary carrier 23 is provided with a disc-shaped main part 23a and a single or plurality of rear-stage planetary shafts 23b that are fixed to the disc-shaped main part 23a. The rear-stage planetary shaft 23b extends from the disc-shaped main part 23a towards the input end IN. The rear-stage planetary gear 22 is rotatably supported on the rear-stage planetary shaft 23b. The rear-stage planetary gear 22 engages with the rear-stage sun gear 21 and the rear-stage internal gear 24.

The rear-stage planetary carrier 23 is rotatably supported via the rear-stage carrier bearing 25 on the device housing 2. An inner ring mounting groove 23c is formed on the circular outer peripheral surface of the disc-shaped main part 23a of the rear-stage planetary carrier 23, and an outer ring mounting groove 2d is formed on the inner peripheral surface of the device housing 2 where the inner ring mounting groove faces. The rear-stage carrier bearing 25 is mounted between these grooves. A deep groove ball bearing is used as the rear-stage carrier bearing 25 in this example. The rear-stage carrier bearing 25 is also not limited to a deep groove ball bearing, and an angular contact ball bearing, a cylindrical roller bearing, or a tapered roller bearing can be used.

The rear-stage sun gear 21 is supported by a thrust bearing 30, which is the second bearing. The thrust bearing 30 is mounted in the direction of the center axis 1a between the rear-stage sun gear 21 and the rear-stage planetary carrier 23. The rear-stage sun gear 21 is rotatably supported by the rear-stage planetary carrier 23 through the thrust bearing 30 from the direction (thrust direction) along the center axis 1a. A cylindrical roller bearing is used as the thrust bearing 30 in this example. The thrust bearing 30 is not limited to a cylindrical roller bearing, and a thrust ball bearing, a cylindrical roller bearing, or a rolling element such as a ball or a sliding bearing that receives the load in the thrust direction can be used.

A preload mechanism 40 is mounted on the rear-stage planetary carrier 23. A preload is applied to the thrust bearing 30 by the preload mechanism 40 along the center axis 1a in the direction towards the rear-stage sun gear 21. In this example, the preload mechanism 40 is provided with a set screw 41 and a pressure plate 42. The set screw 41 is a fixed-position preload member that applies a preload to the thrust bearing 30 through the pressure plate 42 at a fixed position in the direction of the center axis 1a.

To describe in detail, the rear-stage sun gear 21 is provided with a gear end face 21a facing a carrier end face 23d on one side of the disc-shaped main part 23a of the rear-stage planetary carrier 23. A small-diameter shaft end 21b part is formed at the center portion of the gear end face 21a.

The shaft end part 21b protrudes coaxially from the gear end face 21a towards the carrier end face 23d. The carrier end face 23d of the disc-shaped main part 23a of the rear-state planetary carrier 23 is formed at its center portion with a circular recess part 23e that has a fixed depth in the direction of the center axis 1a and opens towards the rear-stage sun gear 21. The shaft end part 21b of the rear-stage sun gear 21 is inserted coaxially into the circular recess part 23e of the rear-stage planetary carrier 23.

A threaded hole 23f is formed in the disc-shaped main part 23a of the rear-stage planetary carrier 23, the threaded hole passing through the center portion of the disc-shaped main part 23a in the direction of the center axis 1a. One end of the threaded hole 23f is open to the bottom surface of the circular recess part 23e, and the other end thereof is open to the other end face 23g of the disc-shaped main part 23a.

The disc-shaped pressure plate 42 is mounted in the circular recess part 23e, such that it can slide in the direction of the center axis 1a. A thrust bearing 30 mounted on the small-diameter shaft end part 21b is sandwiched between the gear end face 21a and pressure plate 42. A set screw 41 is fixed by screwing into the threaded hole 23f from the end face 23g. The tip end face of the set screw 41 is in contact with the pressure plate 42. The set screw 41 presses the pressure plate 42 against the thrust bearing 30, and the prescribed preload is applied to the thrust bearing 30.

Figure 1B:
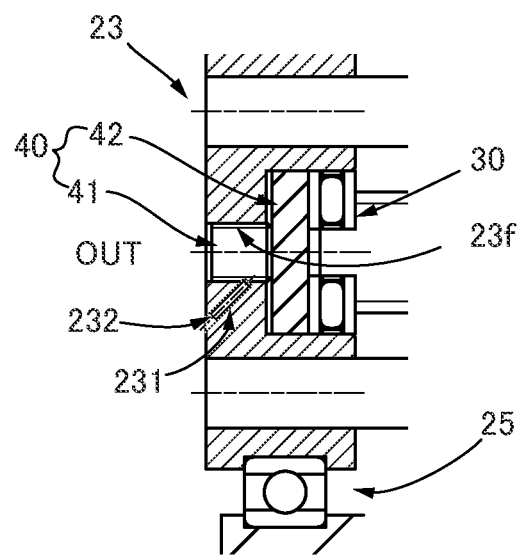
FIG. 1B is a partial longitudinal sectional view showing an example of the planetary reduction gear of FIG. 1A when a locking mechanism is provided to prevent the loosening of the set screw.

In this example, the single set screw 41 is arranged on the center axis 1a, a plurality of set screws 41 can be arranged circumferentially with the center axis 1a as the center. It is preferred that a locking mechanism to prevent loosening be provided for the set screw 41. For example, as shown in FIG. 1B, a separate threaded hole 231 is provided at an angle to the threaded hole 23f in the disc-shaped main part 23a of the rear-stage planetary carrier 23. A screw 232 is screwed into the threaded hole 231 that engages with the set screw 41, preventing loosening. Instead of the set screw 41, a fixed-position preload member such as a pin can be fixed to the disc-shaped main part 23a of the rear-stage planetary carrier 23 by press-fitting, bonding, welding or a combination of these methods.

As explained above, in the planetary reduction gear 1, the rear-stage sun gear 21, which is connected to the front-stage planetary carrier 13, is supported by the device housing 2 through the radial bearing 15 (the first bearing) at the input end IN side and is also supported by the rear-stage planetary carrier 23 in the thrust direction along the center axis 1a through the thrust bearing 30 (the second bearing) at the output end OUT side. The rear-stage planetary carrier 23 is supported by the device housing 2 through the rear-stage carrier bearing 25. The prescribed preload is applied to the thrust bearing 30 by the set screw 41 along the direction of the center axis 1a. With this configuration, the rear-stage sun gear 21 engages with the rear-stage planetary gear 22 in a state where the movement of the rear-stage sun gear is constrained in the direction of the center axis 1a (thrust direction). Therefore, the angle error between the input and output rotations can be suppressed.

The thrust bearing 30 and the preload mechanism 40 are assembled in the circular recess part 23e formed on the rear-stage planetary carrier 23. The rear-stage sun gear 21 can be supported from the thrust direction without increasing the dimension along the center axis 1a of the planetary reduction gear 1. The displacement of the rear-stage sun gear 21 is suppressed with a fixed-position preload mechanism having the set screw 41. The support rigidity is high, and the positional stability of the rear-stage sun gear 21 in the direction (thrust direction) of the center axis 1a is excellent compared to when a constant-pressure preload mechanism having a spring member such as a washer is used.

The rear-stage sun gear 21 is supported by using the thrust bearing 30 as the second bearing in the planetary reduction gear 1. A radial bearing can be used instead of the thrust bearing 30 as the second bearing.

Figure 2:
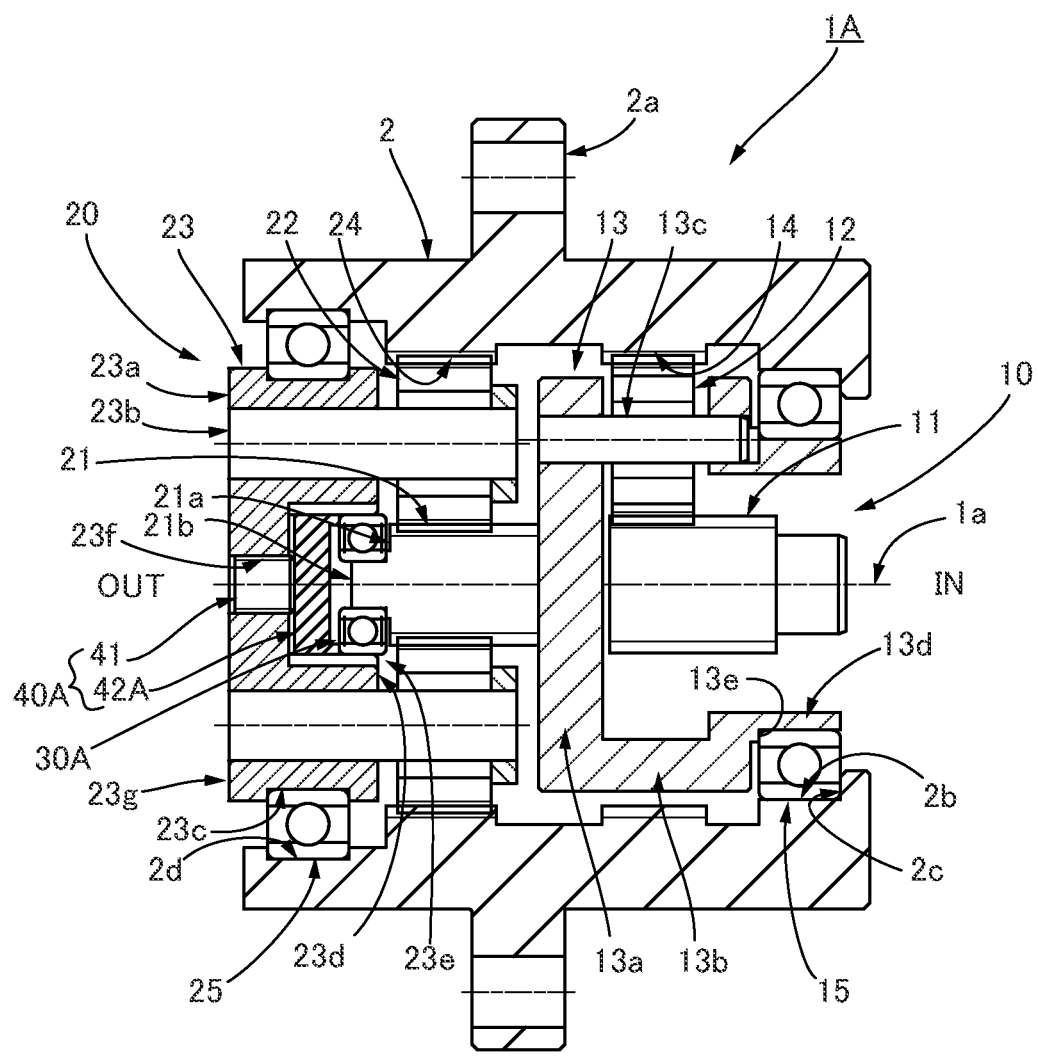
FIG. 2 is a schematic longitudinal sectional view showing an example of a planetary reduction gear in a case in which the thrust bearing in the planetary reduction gear of FIG. 1A is replaced by a radial bearing.

For example, a planetary reduction gear 1A shown in FIG. 2 is provided with a radial ball bearing 30A mounted between a shaft end part 21b of a rear-stage sun gear 21 and a circular inner peripheral surface of a circular recess part 23e of a rear-stage planetary carrier 23. The radial ball bearing 30A can slide in the direction of the center axis 1a along the circular inner peripheral surface of the circular recess part 23e. A preload is applied to the outer ring of the radial ball bearing 30A by a preload mechanism 40A that is provided with a set screw 41 and a pressure plate 42A. The preload eliminates the internal gap of the radial ball bearing 30A, and the rear-stage sun gear 21 and the rear-stage planetary gear 22 engage with each other in a state where the relative displacement along the center axis 1a is constrained. Since the configuration of the other parts in the planetary reduction gear 1A is the same as the planetary reduction gear 1 shown in FIG. 1, the corresponding parts have been assigned the same symbols, and the explanation has been omitted.

The invention claimed is:

1. A planetary reduction gear comprising:
   a cylindrical device housing, a front-stage planetary gear reduction mechanism and a rear-stage planetary gear reduction mechanism, the front-stage and rear-stage planetary gear reduction mechanisms being built into the device housing, the front-stage planetary gear reduction mechanism being located on a first side that is one side in a direction of a center axis, the second-stage planetary gear reduction mechanism being located on a second side that is another side in the direction of the center axis,
   wherein the rear-stage planetary gear reduction mechanism comprises:
   a rear-stage internal gear fixed to the device housing or integrally formed with the device housing;
   a rear-stage sun gear that is arranged coaxially inside the rear-stage internal gear and is connected and fixed coaxially to a front-stage planetary carrier, the front-stage planetary carrier being an output element of the front-stage planetary gear reduction mechanism;
   a rear-stage planetary gear engaging with each of the rear-stage internal gear and the rear-stage sun gear;
   a rear-stage planetary carrier that rotatably supports the rear-stage planetary gear and is rotatably supported by the device housing via a rear-stage carrier bearing;
   a first bearing supporting the front-stage planetary carrier;
   a second bearing supporting the rear-stage sun gear; and
   a preload mechanism that applies preload to the second bearing in a direction along a center axis towards the first bearing,
   wherein the rear-stage internal gear, the rear-stage sun gear and the rear-stage planetary gear are helical gears, respectively;
   the first bearing is a radial bearing that rotatably supports the front-stage planetary carrier with respect to the device housing;
   the second bearing is a radial bearing that rotatably supports the rear-stage sun gear with respect to the rear-stage planetary carrier; and
   the preload mechanism is provided with a fixed-position preload member that is fixed to the rear-stage planetary carrier and, at a fixed position in the direction of the center axis, applies the preload to the second bearing, and wherein the fixed-position preload member is a set screw that is threaded into and fixed to the rear-stage planetary carrier.

2. The planetary reduction gear according to claim 1, wherein the preload mechanism is provided with a mechanism to prevent the set screw from loosening.

3. The planetary reduction gear according to claim 1, wherein the rear-stage planetary carrier is provided with:

a carrier end face opposing the rear-stage sun gear from the second side;

a circular recess part that is formed in a center portion of the carrier end face, opens towards a side of the rear-stage sun gear and has a prescribed depth towards the second side in the direction of the center axis; and a threaded hole that passes through the circular recess part in the direction of the center axis and is opened on a bottom surface of the circular recess part, the rear-stage sun gear is provided with a shaft end part projecting coaxially into the circular recess part, the second bearing is attached to the shaft end part inside of the circular recess part, the preload mechanism is provided with a pressure plate, the pressure plate is mounted inside the circular recess part in a state being located on the second side adjacent to the second bearing and being capable of moving in the direction of the center axis, and the pressure plate is pressed against the second bearing by the set screw that is threaded into and fixed to the threaded hole.

4. The planetary reduction gear according to claim 3, wherein the second bearing is mounting between the shaft end part of the rear-stage sun gear and a circular inner peripheral surface of the circular recess part of the rear-stage planetary carrier, the second bearing is able to slide in the direction of the center axis along the circular inner peripheral surface of the circular recess part, the preload is applied to an outer ring of the second bearing by the preload mechanism so that an internal gap of the second bearing is eliminated and that the rear-stage sun gear and the rear-stage planetary gear engage with each other in a state where relative displacement along the center axis is constrained.

5. The planetary reduction gear according to claim 4, wherein the front-state planetary carrier has a circular portion on the first side thereof, the first bearing is mounted between the circular outer peripheral surface of the circular portion and the inner peripheral surface of the device housing facing the circular outer peripheral surface, the first bearing is sandwiched in the direction of the center axis by a circular step formed on the circular portion and a circular step formed on the inner peripheral surface of the device housing.

* * * * *